Sept. 21, 1954　　　　　　　O. RICE　　　　　　2,689,780
METHOD OF AND APPARATUS FOR PRODUCING AMMONIUM PHOSPHATE
Filed Dec. 27, 1948　　　　　　　　　　　　6 Sheets-Sheet 2

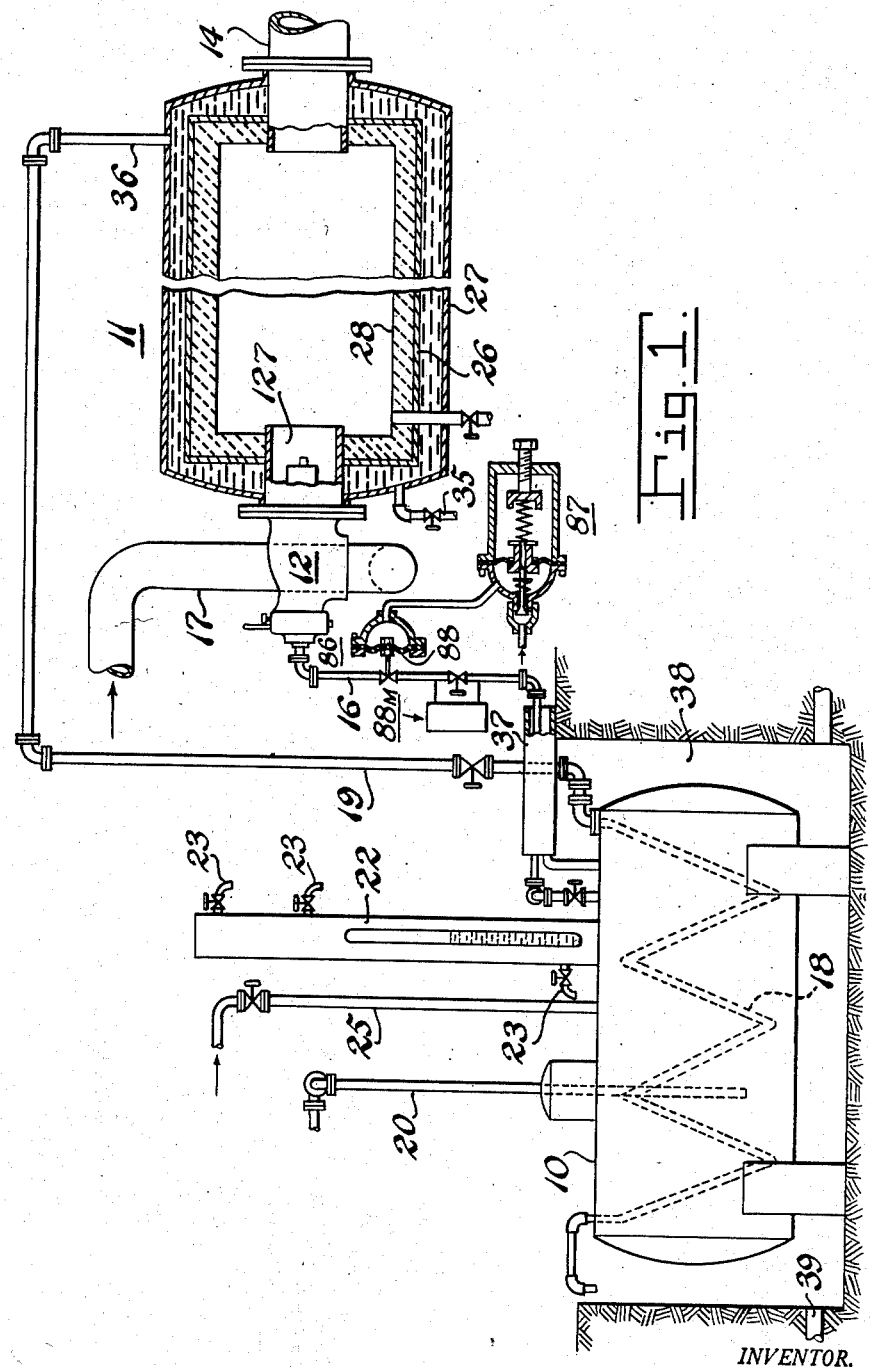

INVENTOR.
OWEN RICE
BY Zugelter & Zugelter
Attys.

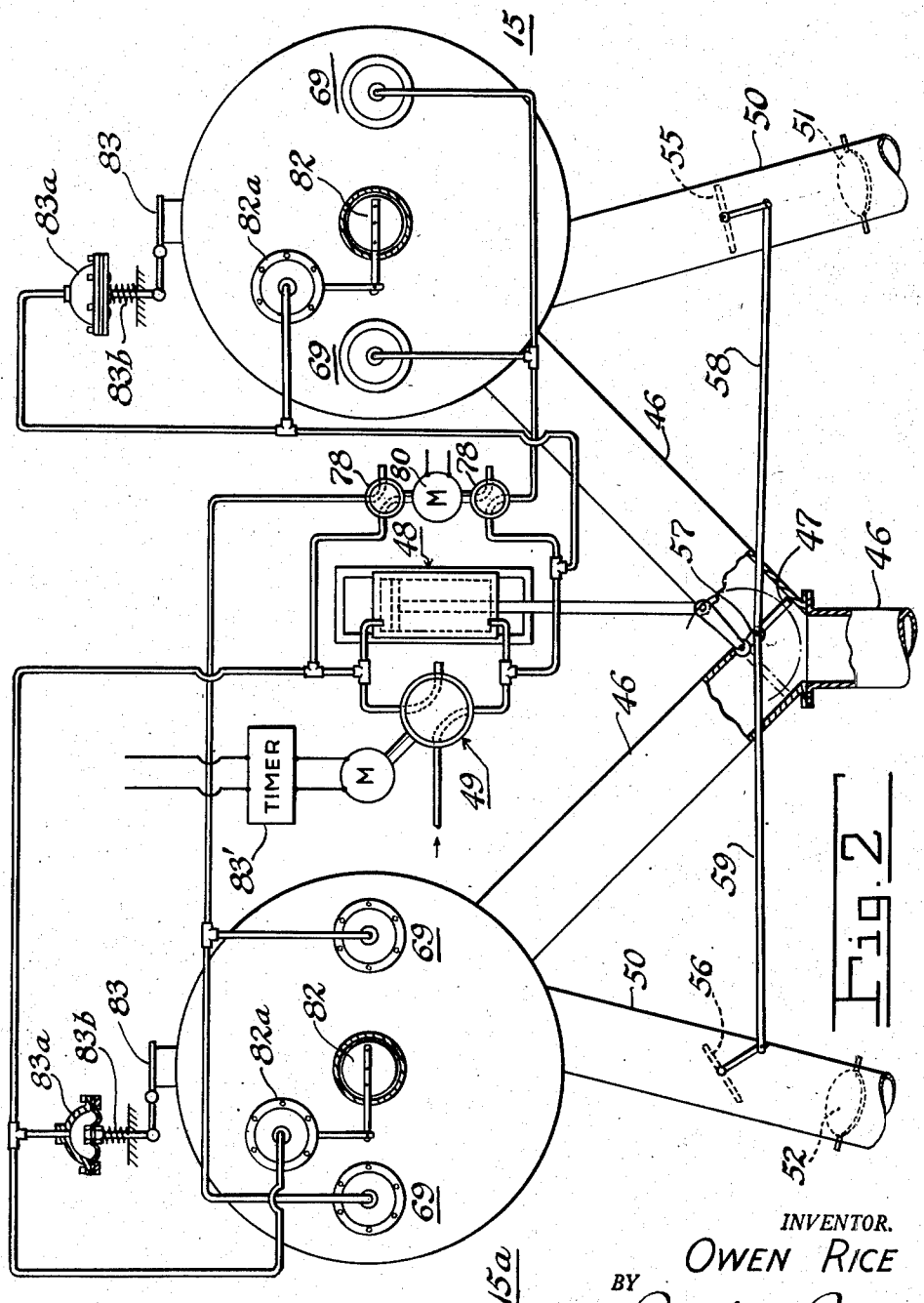

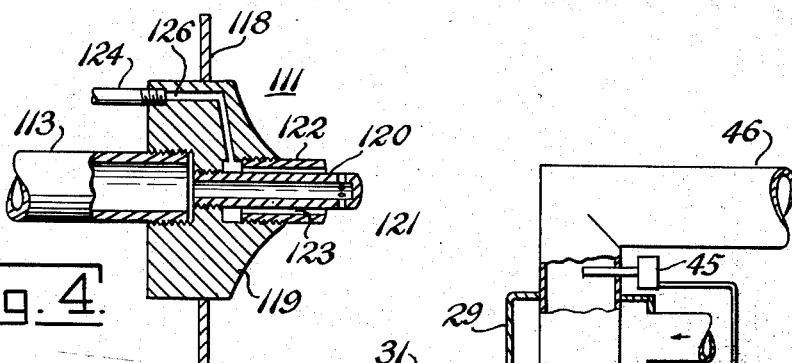
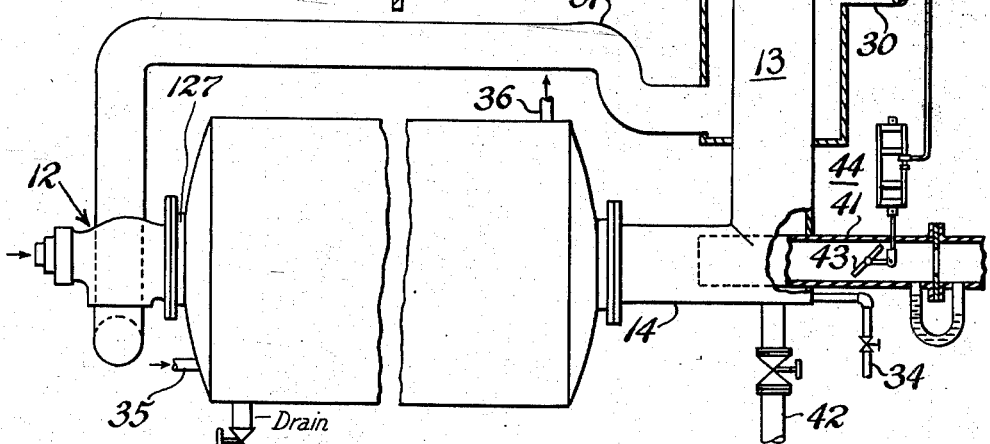
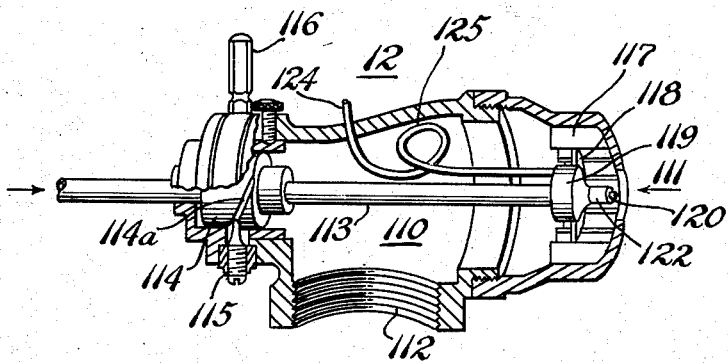

Sept. 21, 1954            O. RICE            2,689,780

METHOD OF AND APPARATUS FOR PRODUCING AMMONIUM PHOSPHATE

Filed Dec. 27, 1948            6 Sheets-Sheet 5

INVENTOR.
OWEN RICE
BY Zugelter & Zugelter
Attys.

Sept. 21, 1954   O. RICE   2,689,780
METHOD OF AND APPARATUS FOR PRODUCING AMMONIUM PHOSPHATE
Filed Dec. 27, 1948   6 Sheets-Sheet 6

INVENTOR.
OWEN RICE
BY
Zugelter & Zugelter
Attys.

Patented Sept. 21, 1954

2,689,780

UNITED STATES PATENT OFFICE 2,689,780

METHOD OF AND APPARATUS FOR PRODUCING AMMONIUM PHOSPHATE

Owen Rice, Upper St. Clair Township, Allegheny County, Pa., assignor to Hall Laboratories, Inc., Pittsburgh, Pa., a corporation of Pennsylvania Application December 27, 1948, Serial No. 67,387

28 Claims. (Cl. 23—106)

This invention relates to a method and apparatus for producing crystalline ammonium metaphosphate as a dry free-flowing powder, and is an improvement upon the process for making ammonium metaphosphate as disclosed in my co-pending application, Serial No. 34,789, filed June 23, 1948, now Patent 2,561,415, and assigned to Hall Laboratories, Inc., of Pittsburgh, Pennsylvania.

An object of this invention is to provide a process for making crystalline ammonium metaphosphate as a dry free-flowing powder wherein elemental phosphorus and air are reacted in a combustion chamber at such rates as to develop temperatures in excess of 1000 degrees F, to form phosphorus pentoxide in a vapor or gaseous state; discharging the gaseous phosphorus penoxide into a reactor, supplying air to the gaseous phosphorus pentoxide before it enters the reactor in amount sufficient to reduce the temperature of the phosphorus pentoxide to a value below that at which ammonia would decompose in substantial amount under the conditions prevailing in the reactor, and introducing ammonia into and mixing the same with the cooled gaseous phosphorus pentoxide as it enters the reactor in amount sufficient to react with moisture contained in the combustion and cooling air and all of the phosphorus pentoxide; then discharging the ammonium metaphosphate reaction product into a collector, and introducing cooling air into the collector at or adjacent the point of entry of the ammonium metaphosphate in amount sufficient to cool the metaphosphate particles below temperatures at which ammonium metaphosphate would become sticky.

A further object of the invention is to provide for pre-heating of the combustion air to temperatures ranging up to about 2000 degrees F. and reacting the air while at a temperature within such range, with the elemental phosphorus.

A still further object of the invention is to so carry on the reaction of air and phosphorus in a combustion chamber having a refractory lined fluid-cooled metal housing that there will be a high temperature differential through the lining whereby temperatures in the combustion chamber may be maintained at such values that any reaction product of water vapor and phosphorus pentoxide forming or tending to for therein may be re-vaporized into gaseous phosphorus pentoxide.

Another object of the invention is to react the elemental phosphorus with pre-heated air and regulate the rate at which air is supplied to a value exceeding the theoretical only by an amount sufficient to burn all of the phosphorus to phosphorus pentoxide.

A further object of the invention is to cool high temperature gaseous phosphorus pentoxide with atmospheric air, and then react the cooled phosphorus pentoxide fumes with ammonia and water in a vapor state, and then quickly cooling the reaction product with atmospheric air to a temperature below 450 degrees F.

Another object of the invention is to atomize elemental phosphorus in a combustion chamber and supply air to the atomized phosphorus in amounts preferably slightly in excess of theoretical, whereby the phosphorus is burned efficiently to gaseous phosphorus pentoxide at high temperatures; then extracting a substantial part of the heat generated as radiant energy by cooling the walls of the combustion chamber with a fluid, and removing the remaining heat units developed by supplying atmospheric cooling air to and mixing it with the gases as they are discharged from the combustion chamber.

A further object of the invention is to burn elemental phosphorus to gaseous phosphorus pentoxide by atomizing the phosphorus with compressed air, and supplying air which has been preheated to temperatures from above ambient to about 2000 degrees F., to the atomized phosphorus, in amounts ranging from about twenty per cent (20%) to about three hundred per cent (300%) in excess of theoretical.

A further object of the invention is the provision of apparatus for the continuous production of crystalline ammonium metaphosphate as a free-flowing powder, comprising means for efficiently burning elemental phosphorus to phosphorus pentoxide in a combustion chamber using relatively slight excesses of air over theoretical to thereby generate high temperatures in the combustion chamber whereby a large proportion of the heat in the form of radiant energy may be dissipated to a cooling fluid in a cooling jacket surrounding the combustion chamber, means for cooling the phosphorus pentoxide gases by directly injecting atmospheric air in to the gases as they are discharged from the combustion chamber, means for reacting ammonia and water vapor as contained in either or both the combustion air and cooling air, or separately added in a reactor through which the gases are passed to form ammonium metaphosphate, means for collecting the metaphosphate, and means for supplying cooling air into the collector to mingle with the metaphosphate laden air delivered to the collector so as to cool the metaphosphate to a temperature below its decomposition temperature under the conditions of collection in the collector and also in the event the collector is an air pervious filter to protect the filters against burning or charring if made from materials such as cotton, nylon, wool, or other fibres which deteriorate at excessively high temperatures.

A still further object of the invention is to provide apparatus for continuously producing ammonium metaphosphate in which there is automatic control of combustion air, phosphorus feed, ammonia feed, and the temperature of the ammonium metaphosphate laden air discharging from the reactor.

These and other objects of the invention will be apparent from the following description taken in conjunction with the accompanying drawings in which:

Figs. 1 and 1a are tandem views in side elevation, parts being in section, of apparatus embodying a form of my invention and adapted to carry out the process thereof;

Fig. 2 is a top plan view of Fig. 1a showing apparatus for collecting the product output of the apparatus;

Fig. 3 is a view in perspective in longitudinal section of a phosphorus burner that may be utilized in the apparatus of Figs. 1 and 1a;

Fig. 4 is an enlarged view in section of a burner of the type shown in Fig. 3;

Fig. 5 is a view of a combustion chamber or fire box in which elemental phosphorus is burned, provided with a pre-heater for heating the phosphorous combustion air;

Figure 6:
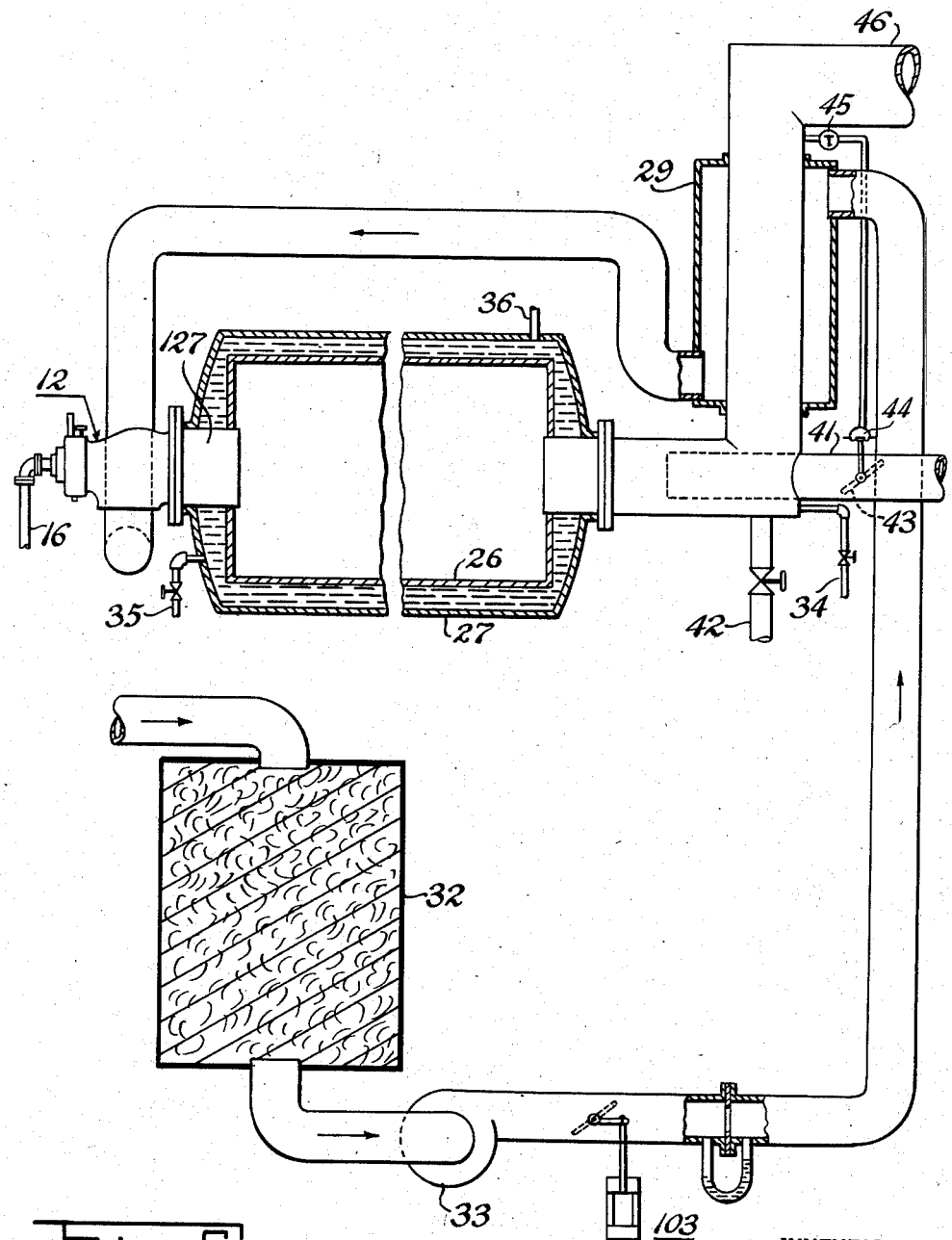
Figure 7:
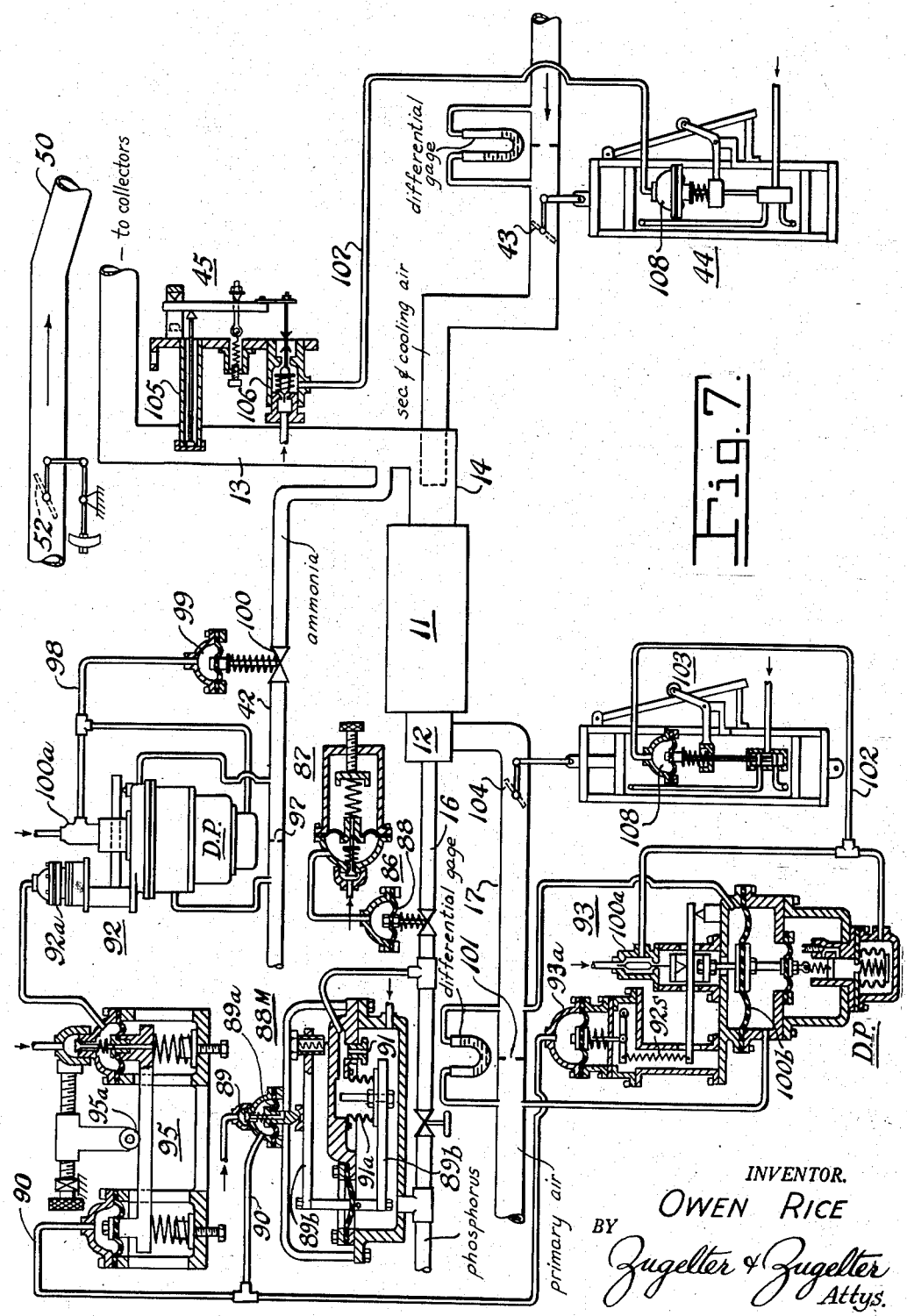

Fig. 6 is a view of a combustion chamber or fire box and reactor showing means for supplying dried and pre-heated primary air to the phosphorus burner; and Fig. 7 is a diagrammatic view of apparatus for automatically controlling the rates of feed of primary air and phosphorus feed to the burner, the rate of supply of ammonia to the reactor, and for regulating the rate at which cooling air is supplied to the gaseous phosphorus pentoxide discharging from the fire box into the reactor.

Throughout the drawings and specification, like reference characters indicate like parts.

According to the method of this invention, crystalline ammonium metaphosphate as a dry free-flowing powder, is produced by reacting air and elemental phosphorus in a combustion chamber or fire box to form phosphorus pentoxide in a gaseous state.

I supply a continuous flow of the elemental phosphorus and air for combustion, hereinafter called primary air, to the fire box, and so regulate the rates of each that temperatures above 900 degrees F. to as high as about 2700 to 3000 degrees F. are developed in the fire box. At these temperatures phosphorus pentoxide, the reaction product of phosphorus and air, is in a gaseous state. If undried atmospheric air is used as primary air, water vapor, in a superheated condition, will be mixed with the gaseous phosphorus pentoxide. At these temperatures the thermal energy developed in the fire box is to a large degree radiant energy. I therefore take advantage of this fact and cool the fire box walls with a cooling fluid such as air, water, or liquid chemical solutions having high temperatures at low vapor pressures, as for example, "Dowtherm," a diphenyl compound. A large part of the heat generated in the fire box is thus dissipated as radiant energy to the cooling fluid.

The hot phosphorus pentoxide gases, and the water vapor mixed therewith, are discharged from the fire box into a reactor to which ammonia, preferably as $NH_3$ gas, is supplied in amount sufficient to insure complete reaction between the ammonia and the water vapor and all of the phosphorus pentoxide.

To avoid excessively high temperatures in the reactor or temperatures at which ammonia might decompose or burn in the presence of a mixture of gaseous phosphorus pentoxide and the water vapor, I supply cooling air into the stream of mixed gaseous phosphorus pentoxide and water vapor as the stream leaves the fire box but before it enters the reactor. By using as little excess primary air as possible to effect complete conversion of the phosphorus to gaseous phosphorus pentoxide in the fire box, the weight of hot gases to be cooled on discharging from the fire box will be less than if large excesses are used; therefore, by using a relatively small excess of primary air I may more efficiently cool these gases with atmospheric air as they discharge from the fire box and pass into the reactor.

I prefer to introduce the ammonia into the cooled gases before they enter the reactor, so as to afford ample opportunity for thorough mixing.

Ammonium metaphosphate is formed instantly in the chamber of the reactor, apparently while in a gaseous phase, and on cooling quickly solidifies into minute particles of crystalline ammonium metaphosphate.

The reaction product flows continuously out of the reactor into a collector wherein particles of ammonium metaphosphate settle out and are collected. The collectors employed may be of the "Cottrell" precipitator type or air pervious filters comprising a collection or expansion chamber or hopper, and a plurality of air pervious filters made of fabric woven from wool, cotton, nylon, or glass fibres. In the air pervious type filter, a large part of the ammonium metaphosphate particles settle out in the expansion chamber, while the remainder carried in suspension in the air and vapors is caught by the filters as the air and vapors pass through them.

While printed publications, and textbooks on ammonia indicate that it decomposes or burns at about 900 degrees to about 930 degrees F., I have found that the ammonia may be introduced into the mixture of gaseous phosphorus pentoxide and water vapor before entry into the reactor at temperatures up to between 1200 degrees and 1400 degrees F. without any apparent decomposition of the ammonia, at least not to an extent sufficient to impair formation of the ammonium metaphosphate reaction product, $NH_4PO_3$. In the specification the formula $NH_4PO_3$ when used alone signifies ammonium metaphosphate or ammonium metaphosphate reaction product. I do not prefer to operate at temperatures as high as 1200 to 1400 degrees F. because, even though the ammonia may not decompose to any material extent at these temperatures, if I use air pervious filters, the filter fabrics would be exposed to temperatures at which they might char or burn. To protect the bags of the filters, I cool the gases to a reasonably low temperature before they enter the reactor, and then further cool the reaction product $NH_4PO_3$ in the filter hoppers by supplying atmospheric air into the filter hoppers at the point where the reaction product $NH_4PO_3$ enters them. Even though a collector of the Cottrell type is used, I would cool the reaction product in the collector.

In practice I regulate the temperature of the reaction product $NH_4PO_3$ and the air in which it is suspended, at or near the point where it leaves the reactor, by measuring the temperature at this point and adjusting the cooling air supplied to the phosphorus pentoxide and water vapor in the passage between the fire box and the reactor.

I prefer that the temperature in the reactor shall not exceed about 1400 degrees F. and that it shall not fall below about 600 degrees F. In the main, I so adjust the cooling air that the temperature at or adjacent the outlet of the reactor is within a range of 700 degrees F. to 1100 degrees F. If this temperature is too high for the collector or the filter elements of air pervious filters the temperature is reduced by the addition of more cooling air ahead of the reactor. I so regulate the rate of supply of cooling air to the hoppers of the collectors that the reaction product $NH_4PO_3$ is cooled to a temperature below about 450 degrees F., otherwise the $NH_4PO_3$ particles on standing at temperatures above this value, are liable to decompose into a sticky mass and clog the collector, particularly the fabric filters. Apparently the sticky mass results from a release of ammonia and the pick up of water on what seems to be an exchange action. Whatever the explanation, conditions resulting in this sticky mass are to be avoided.

If air-pervious filters, such as bags, are used as the collector, the filter units accumulate layers of the fine $NH_4PO_3$ material on their surfaces. These bags therefore have to be shaken or vibrated at regular intervals sufficiently frequent to keep the filters sufficiently pervious to air that they will function under moderately low presssure on the filtering side. I therefore use several filter units and deliver the reaction product $NH_4PO_3$ to these units in a sequence, so that while one unit is filtering, another may be shaken or vibrated to dislodge the adhering fine particles of $NH_4PO_3$.

The $NH_4PO_3$ which accumulates in the hoppers is removed by suitable means such as conveyors for packing in barrels or bags. If desired, the hoppers may be so designed that the reaction product $NH_4PO_3$ may be discharged through slide valve controlled chutes directly into bags or other containers in a manner similar to that by which flour and grain, for example, are filled from a slide valve controlled chute.

The foregoing is a general overall description of the process, but there are other details to be explained and observed in order to practice the process to the best advantage.

Contrary to expectation, elemental phosphorus is difficult to burn in spite of the fact that it will spontaneously burst into flame on exposure to the air. It has a high surface tension and is atomized into fine particles with considerable difficulty. A particle or drop of phosphorus will burn vigorously on the surface but considerable time will pass before the particle or globule burns completely. I have found that phosphorus is difficult to burn completely at any rate of burning, even in an atomizing burner when the primary air is unheated atmospheric air. I therefore improve materially the burning of the phosphorus to phosphorus pentoxide in the fire box by pre-heating the primary air and supplying it in excess of theoretical by an amount sufficient to effect complete conversion of the phosphorus to phosphorus pentoxide. I have found that by employing small excesses of primary air pre-heated to from about 200 degrees F. to 500 degrees F., higher temperatures can be developed in the fire box or combustion chamber and thereby insure the transfer of a larger portion of the thermal energy as radiant heat to the fluid cooled walls of the fire box. The primary air may be pre-heated to still higher temperatures as previously indicated herein. I may supplement the effect of the pre-heated primary air by using compressed air in the burner and thereby atomize the phosphorus to a greater extent. By employing pre-heated primary air and compressed atomizing air, I am able to burn phosphorus with facility and flexibility of burning rate control.

If pre-heated atmospheric air containing moisture is used as the primary air and if the walls of the fire box are of steel or boiler metal directly exposed to the radiant phosphorus flame, I have found that a small amount of a glassy, liquid-like reaction product of moisture and phosphorus pentoxide will condense and accumulate in the fire box. Instead of reevaporating at the temperatures prevailing in the fire box, this liquid accumulates until finally the fire box must be drained. Apparently this glassy, liquid-like product has little, if any resistance to heat flow so that radiant energy passes through it to the liquid cooled walls of the fire box without loss of heat to this liquid-like product. The result is that the temperature of this glassy, liquid-like reaction product does not become high enough to be re-evaporated.

To overcome this difficulty when primary air containing moisture is used, I line the walls of the fire box with refractory, the thickness of the lining being about two inches. This lining impedes the transfer of heat to the liquid cooled metal walls of the fire box to such extent that the temperatures on the fire side of the refractory lining are much higher, in fact, high enough to re-evaporate the reaction product of water and phosphorus pentoxide into presumably water vapor and gaseous phosphorus pentoxide.

If I employ dried primary air, as by removing moisture down to that corresponding to a dew-point of say 0° to —10° F., whether pre-heated or not, the glassy liquid-like product will not condense and gradually accumulate in the fire box. When dried primary air is used, the moisture necessary for the reaction product $NH_4PO_3$ to form in the reactor must be supplied to the phosphorus pentoxide gases on their passage from the outlet of the fire box to the reactor. The amount of water added will be in addition to that contained in the cooling air which is admitted at the same point. The total amount of water should be such that there will be present in the reactor not less than the minimum mol percents of water, phosphorus pentoxide and ammonia required in the theoretical reaction by which $NH_4PO_3$ is formed. In practice the mol percents of water and ammonia as $NH_3$ are supplied in excess of the stoichiometric requirements.

The amounts of either water or ammonia in excess of the amounts theoretically required are not critical; and while excesses should be supplied, unnecessary excesses of ammonia are wasteful and expensive and too much water may result in a sticky product. The excesses of ammonia and water should be such that all of the phosphorus pentoxide is reacted to form ammonium metaphosphate.

Other precautions are also to be observed to avoid formation of the glassy, liquid-like reaction or condensation product of water and phosphorus pentoxide after the gaseous phosphorus pentoxide has discharged from the fire box. To avoid this difficulty the length of the path of the gaseous phosphorus pentoxide and the admixed cooling air from the outlet of the fire box to the reactor should be as short as practicably feasible. The mixture of gaseous phosphorus pentoxide and water vapor of the cooling air should be reacted as promptly as possible in the reactor with the ammonia. The reaction so far as can be determined is spontaneous and does not appear to follow the theoretical equation for the reaction of water, $NH_3$ and $P_2O_5$ in the aqueous phase. Evidence of this is the fact that the type of ammonium metaphosphate produced in accordance with my process can not be reproduced either with a mixture of water, solid $P_2O_5$ and $NH_3$, or a mixture of metaphosphoric acid, $HPO_3$ and $NH_3$ or a mixture of orthophosphoric acid and $NH_3$. Furthermore, by this process, I have not been able to produce either ammonium pyrophosphate or ammonium orthophosphate.

The transit time through the reactor of the reaction product $NH_4PO_3$ is about one second or less and from the reactor to the hopper only a fraction of a second longer. Thus, in a very short time interval, the phosphorus is converted to gaseous phosphorus pentoxide at temperatures ranging from about 900 degrees F. to temperatures probably as high as 3000 degrees F., cooled at or near the outlet of the fire box, reacted with water vapor and ammonia to form ammonium metaphosphate, $NH_4PO_3$, and finally cooled to a stable temperature below 450 degrees F. while or as it is discharging into the hopper of the filter.

The ammonium metaphosphate so formed is crystalline, having a definite characteristic X-ray diffraction pattern, and an extremely small particle size of the order of about 0.023 micron. The particle size will vary to some extent, depending upon the rate at which the $NH_4PO_3$ particles are cooled from the temperatures at which they are formed in the reactor to a stable temperature under 400 degrees F. on delivery to the collector. Slow cooling or annealing of these particles at about 400 degrees F. tends to increase the particle size. For example, on annealing at 390 degrees F., material produced in accordance with this process, for a period of about one hour, the particle size increased from about 0.023 to 0.092 micron as calculated by the Scherrer method, from X-ray diffraction patterns of the samples before and after annealing.

According to the above process, I may react elemental phosphorus with atmospheric air containing moisture in a combustion chamber having liquid cooled walls, at rates sufficient to produce temperatures from above 900 degrees F. to probably as high as 3000 degrees F. To avoid the trouble incident to the slow accumulation of the reaction product of water and phosphorus pentoxide, I may line the liquid cooled walls in the combustion chamber with refractory to obtain sufficiently high temperatures to re-evaporate the water-phosphorus pentoxide reaction product into water-vapor and phosphorus pentoxide. If I employ dried primary air for converting the phosphorus to gaseous phosphorus pentoxide, I may omit the refractory lining because there will be no condensation of the reaction product of water and phosphorus pentoxide. However, the lining may be used if it is desired to operate at higher temperatures in the combustion chamber.

To facilitate burning of the phosphorus to gaseous phosphorus pentoxide, I may preheat the primary or reacting air, whether dried or undried atmospheric air is employed.

The gaseous phosphorus pentoxide and water vapor, undried air being employed, flow continuously from the fire box into a duct leading to the reactor. Atmospheric cooling air is introduced into this duct at such a rate as to cool the mixture of phosphorus pentoxide and water vapor to a point below or under 1400 degrees F. The temperature of this mixture should not be reduced to a value below 600 degrees F. However, temperatures ranging from 700 to 1100 degrees F. have been found satisfactory. Immediately following the point where the cooling air is introduced into the mixture of phosphorus pentoxide and water vapor, ammonia is added. The mixture of ammonia, gaseous phosphorus pentoxide and water vapor react in the reactor, and this reaction product is suspended in the excess air and ammonia and excess water vapor. I measure the temperature of this mixture, having the ammonium metaphosphate particles in suspension therein, at a point close to the discharge end of the reactor and so adjust the cooling air that the temperature at this point is maintained at the desired value. This mixture containing the ammonium metaphosphate particles in suspension, discharges into the collector and at the point where the material discharges into it, additional cooling air is introduced to make certain that the ammonium metaphosphate product is cooled to a stable temperature in the collector. I have found that this temperature should be under 450 degrees F. I prefer to finally cool the reaction product as it enters the collector to a temperature between 200 degrees F. and 400 degrees F. so that the collector may not be damaged by excess temperature.

If dried air is employed as primary air for reacting the phosphorus to gaseous phosphorus pentoxide, I add the necessary water to the gaseous product before it enters the reactor with the ammonia. The amount of water added as such will be determined by the weight of phosphorus pentoxide passing through the reactor per unit of time and the weight of ammonia, and humidity of the cooling air supplied to the gases discharging from the fire box into the reactor. If I use atmospheric air as primary air, it may be necessary at times to supplement the moisture contents of both the primary air and the cooling air, with water.

In the several views of the drawing, apparatus is illustrated whereby the process disclosed in the preceding description may be carried out.

Figure 1A:
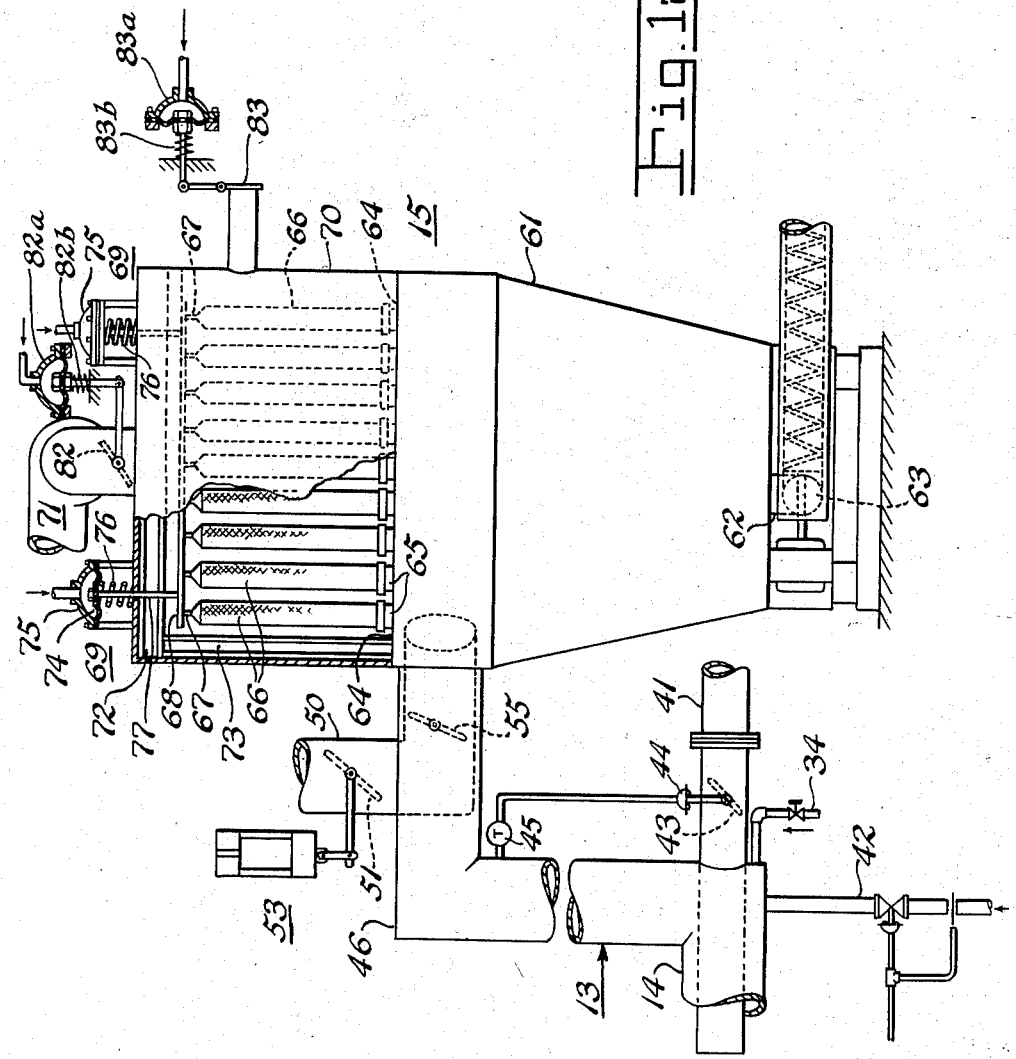

Figures 1 and 1a are tandem views illustrating the apparatus as a unit, the apparatus depicting the process from beginning to end; and Fig. 2a is a top plan view of the filter units employed. The apparatus illustrated in these views comprises a tank 10 in which the elemental phosphorus is stored, a fire box or combustion chamber 11 having fluid-cooled walls, and a phosphorus burner 12. The apparatus comprises also a reactor or reaction chamber 13 into which the gaeous phosphorus pentoxide formed in the fire box is delivered through a connecting duct or pipe 14, and a collector 15 connected to the outlet of the reactor.

Collector 15 may be of the Cottrell precipitator type or of the air pervious type having fabric filters. As shown, collector 15 is of the air pervious fabric filter type.

Elemental phosphorus is delivered from tank 10 through a pipe 16 to the phosphorus burner 12 and the primary or reaction air is supplied by a duct 17 connected to a forced draft fan (not shown).

The elemental phosphorus is maintained in a fluid condition by circulating hot water through heating coils 18 within tank 10. When the process is in operation hot water or other fluid is supplied from the fire box or combustion chamber through pipe 19. Tank 10 is filled with phosphorus through a pipe 20, and the pressure required to force the phosphorus into the burner is developed by a stand or head pipe 22, water being run into the tank until there is sufficient head to provide the desired rate of feed of phosphorus to the burner. Overflow cocks 23 may be provided at spaced points in the head pipe for regulating the pressure head on the phosphorus. By opening the cock located at the desired head level and closing all others, and running water from a supply pipe 25 into the phosphorus storage tank at a rate just sufficient to have overflow through the open cock, the pressure head on the phosphorus is maintained constant.

The fire box or combustion chamber is preferably in the form of a hollow cylinder which is closed at both ends. Each end is ported, one port accommodating burner 12 and the other serving as the outlet to which duct or pipe 14 is connected. As shown, fire box 11 comprises two closed ended cylinders 26 and 27 disposed one within the other. These cylinders may be made from any suitable metal whether ferrous or non-ferrous, but I prefer a metal such as stainless steel. Cylinder 27 is longer and has a greater diameter to provide a hollow space between it and the inner cylinder through which a cooling fluid such as air, water, or fluids that boil at low pressure but high temperature, such, for example, as "Dowtherm." As thus constructed, the ends and walls of the fire box are fluid-cooled.

In practice, the volume of the fire box or combustion chamber 11 is designed to have adequate surface in the inner walls thereof for the transmission of a substantial part of the radiant thermal energy developed by the burning phosphorus. I also so design the fire box that the volume of the fire box will bear a relationship to the rate at which phosphorus is to be burned in a given installation. For instance, the rates of volume to phosphorus burned in pounds per hour can be 0.5 to 1, i. e., one-half cubic foot per pound of phosphorus burned per hour. This ratio may be lower or higher, as for example, a ratio of 1:1 i. e. one cubic foot per pound of phosphorus per hour. Thus, if I design the furnace to burn from say 100 to 300 pounds of phosphorus per hour the volume of the combustion space should be between 50 to 100 cu. ft. for the 100 pound per hour rate, and 150 to about 300 for the 300 pound per hour rate. By properly atomizing the phosphorus and by preheating the primary or combustion air to various temperatures, I can effectively burn phosphorus at rates considerably higher than one pound per hour per cu. ft. of combustion space.

In the arrangement shown in Figs. 1 and 1a atmospheric air containing moisture, that is, undried air, is supplied to the burner. Therefore, for reasons explained in the description of the process, I line or cover the inner surface of the walls of the fire box with a refractory lining 28. This lining so retards the transfer of heat from the burning phosphorus that any reaction product of water and gaseous phosphorus pentoxide that may condense in the fire box or flow into it from the connecting duct 14 will be re-evaporated into water-vapor and gaseous phosphorus pentoxide. The temperature in the fire box will run higher and the surface of the refractory lining will be so much hotter than the metal wall of the fire box that condensation of the reaction product of water and phosphorus pentoxide will occur, if at all, in such small amounts as not to adversely affect the operation of either the apparatus or the process.

The primary air supplied to burner 12 may be preheated to facilitate burning of the phosphorus. Pre-heated primary air may be used whether or not the fire box is lined with refractory. Fig. 5 shows an arrangement for preheating the primary air. This arrangement comprises a hollow metal shell 29 disposed about the reactor 13. The primary air enters by a pipe 30 at a point adjacent the top or discharge end of the reactor and leaves at the lower or entering end of the reactor through a pipe 31 leading to the primary air duct 17. As the primary air passes through the preheater it is heated to temperatures ranging upwardly towards about 900 degrees F., depending on the temperature in the reactor. The heat given up to the primary air aids in cooling the reaction products forming in and passing through the reactor.

The preheating of the primary air may also be accomplished by a separately fired preheater, in which case the preheater could be constructed similarly to the reactor 13 and shell 29, and fuel burned in a chamber corresponding to the reactor, the air being passed through the space between the shell and the heated walls of the heater.

When it is desired to use a fire box without a refractory lining such as shown in Fig. 1a, and the accumulation of the liquid glass-like reaction product of water vapor and phosphorus pentoxide is to be avoided, I may dry the primary air before passing it on to the burner, as shown in Fig. 6. As there illustrated, atmospheric air is pulled through a drier 32 by means of an induced draft or suction fan 33. If preheating of the dried air is desired, it is passed through the preheater 29 and thence to burner 12. The drier 32 may be of any commercial form or type as the commonly used silica gel driers, or alumina, refrigerated brines or other suitable driers. When dried primary air is used the water required for the reaction of NH3 and phosphorus pentoxide and water to produce NH4PO3 is delivered to duct 14 from a pipe 34.

The cooling medium for the walls of the fire box is delivered by a pipe 35 to the space between cylinders 26 and 27 at the burner end of the fire box and discharges therefrom through a pipe 36 at the opposite end. The fluid, water, for example, is heated and delivered to the coils in the phosphorus storage tank thus keeping the phosphorus in the necessary fluid condition. Some of this water is also diverted into a housing 37 in which the phosphorus feed pipe 16 is enclosed to keep the phosphorus in the feed line in fluid condition. The hot water, or fluid thus used discharges into a pit 38 in which the phosphorus storage tank is located. Water is allowed to accumulate in the pit to a depth sufficient to cover the entire phosphorus contents of the tank should a leak accidentally develop. Excess water delivered to the pit discharges through an overflow 39 to drain.

The air for cooling gaseous phosphorus pentoxide is supplied by a pipe 41 into the connecting or outlet duct 14. As shown, this pipe extends into duct 14 and discharges the cooling air contra to the flow of gaseous phosphorus pentoxide from the fire box. Thus the cooling effect of this air not only cools the pentoxide and the admixed excess air and water vapor (undried primary air being used) but also protects duct 14 against excessive temperature. If water need be added, it may be supplied either as liquid water or steam through the pipe 34 and sprayed into the mixture of air and phosphorus pentoxide. The ammonia required to effect reaction between it and the water vapor and all of the gaseous phosphorus pentoxide is supplied through a pipe 42. Pipe 42, it will be understood, is connected to a storage tank (not shown) containing ammonia vapor or gas. The ammonia may be stored and supplied to the feed pipe 42 in the manner disclosed in my co-pending application, Serial No. 34,790, filed June 23, 1948, now Patent 2,561,415 and assigned to Hall Laboratories, Inc. of Pittsburgh, Pennsylvania.

The rate at which cooling air is supplied to duct 14 is regulated by a damper 43 actuated by a positioning device 44, such as a power cylinder, under the control of a thermostat 45. Thermostat 45 is disposed to respond to the temperature of the excess air, ammonia and water vapor in which the reaction product $NH_4PO_3$ is suspended, as it discharges from the reactor 13. Thus, the temperature responsive element of the thermostat is shown extending into the reactor at a point adjacent to or near its outlet and damper 43 is adjusted to hold the temperature at this point below some predetermined maximum value, say 850 degrees F.

Additional cooling air is supplied to the hopper at a point where it may mix intimately and thoroughly with the discharge from the pipe leading into the filter hopper, thereby cooling the particles of $NH_4PO_3$ to a stable storage temperature and reducing the temperature of the excess air, ammonia and water vapor to a value that will not be injurious to the filters as these are usually made of cotton duck, wool, nylon, or fibre glass.

Since the filters must be vibrated or shaken at sufficient intervals to dislodge adhering $NH_4PO_3$ particles and keep them in a porous condition, at least two filter units are required so that the reaction product may be delivered alternately to one and then the other. These units are designated as 15 and 15a in Fig. 2a. While one unit receives reaction product $NH_4PO_3$, the other is being shaken to dislodge material adhering to the filters.

In order that the discharge from reactor 13 may be delivered alternately to the filter units 15 and 15a, a Y-pipe 46 is connected to reactor 13 and to the hoppers of the respective filter units and a damper 47 is provided for transferring the discharge from one to the other. This damper is operated by a power cylinder 48 which is controlled by a timer operated valve 49. At preset intervals, the timer causes the valve 48 to operate and deliver pressure, such as compressed air, alternately to one end and then the other end of the cylinder, while connecting the cylinder end not receiving pressure to exhaust. Also, while one or the other units 15 and 15a is not receiving the discharge from the reactor, the filters thereof are shaken or vibrated. The shaking function is effected automatically and a schematic illustration of apparatus for accomplishing this function is shown in Fig. 2a and will be described later herein.

Each filter unit 15 and 15a is provided with a cooling air pipe 50 and these discharge into the respective hoppers in the manner shown in Fig. 2a. The rate at which cooling air is supplied through pipes 50 to the hoppers can be adjusted non-automatically by means of dampers 51 and 52, operated by manually controlled power cylinders 53. The cooling air supplied by pipes 50 should not be introduced into the ducts leading from the reactor to the filter hoppers as plugging of the ducts is likely to result. The cooling air should be introduced as shown to avoid this objectionable result.

When the discharge from the reactor is shut off from the respective filter units, the cooling air thereto is also shut off. Therefore, I provide shut-off dampers 55 and 56 in the branches of the Y-pipe 46 and operate them from a crank 57 on transfer damper 47 through linkages 58 and 59. Thus, when the transfer damper 47 shuts off flow from the reactor to filter 15, shut-off damper 55 is closed; similarly, shut-off damper 56 is closed when discharge from reactor 13 to filter 15a is shut off by damper 47.

Filters 15 and 15a as illustrated, are of the same construction, therefore, a description of one will suffice for the other.

Filter 15 comprises a hopper 61 which tapers towards the bottom and terminates in a discharge opening through which the ammonium metaphosphate can flow into the housing or trough 62 of a screw conveyor 63. A plate or cover 64 extends across the top of the hopper. This plate is provided with a plurality of openings each rimmed on the upper side of the cover by a flange 65 to which the lower open end of a filter bag 66 is clamped. The upper ends of the bags are closed and connected by links 67 to an overhead supporting frame 68. The supporting frame 68 is yieldingly mounted and disposed to be vibrated or shaken by means of vibrators or shakers 69. The filter bags are preferably enclosed in a pressure tight housing 70 to which an exhauster fan 71 is connected for impressing suction or subatmospheric pressure on the bags. The sides and top of the housing 70 are supported and reinforced by structural members 72 and 73, preferably from the inside of the housing.

I prefer that the upper part of the hopper be designed with substantial volume so as to provide in effect an expansion chamber below the filter bags for the discharge from the reactor, to facilitate settling out of the particles of ammonium metaphosphate, as well as to aid in cooling the excess air, ammonia, water vapor and the particles of ammonium metaphosphate. This will relieve the filter burden on the bags and also keep the temperature on them down to values that will give longer bag life.

The shakers 69, as illustrated, are similar in construction. Each comprises a diaphragm 74 clamped at its rim to a cup-like member 75 to which a pressure fluid, such as compressed air, is alternately supplied and exhausted from the same.

The diaphragms are provided with compression springs 76 that resist the force of the pressure when applied and return the diaphragms when the pressure is relieved. The diaphragms are connected by push rods 77 to the support frame 68.

Pressure is delivered to and exhausted from the diaphragms with such frequency as to effectually accomplish the dislodgment of ammonium metaphosphate from the bags.

The delivery of pressure to and exhausting the same from the diaphragms may be accomplished by a rotary valve 78 or other suitable means. In the arrangement shown, pressure for actuating the shakers is delivered from the particular line which is supplying pressure to the transfer damper cylinder 48. The valve plugs of valves 78 are rotated continuously by a motor 80. These valves are so ported that air from cylinder 48 is not exhausted to atmosphere directly. The air is delivered to the diaphragms 74 and exhausted from them without disturbing the power cylinder supply.

When a filter unit is being shaken a damper 82 in the intake of its exhauster fan 71 is closed and a vent valve 83 is opened to equalize the pressure on the inside and outside of the filter bags. Dampers 82 and vent valves 83 are operated in timed relation with the operation of power cylinder 48 that actuates the transfer damper. Thus each damper 82 is actuated to closed position by a pressure actuated operator, such as diaphragm operator 82a when operating pressures are being delivered to shakers 69 of units 15 and 15a. The operating pressure is obtained from the lines leading from valve 49 to the opposite ends of power cylinder 48. Each damper 82 is returned to open position by a spring 82b when the operating pressure is shut off by exhausting to atmosphere through valve 49. The vent valves 83 are opened by pressure actuated operators, such as diaphragm operators 83a. Pressure is delivered to these operators from the same lines that supply operators 82a. The vent valves are returned to closed position by springs 83b when the pressure is shut off and exhausted to atmosphere through valve 49.

The length of the intervals between shaking of the bags in the filter units depends on the necessity therefor. Necessity for shaking is best made known by rising pressures on the inside of the bags and in the hoppers. When this pressure rise exceeds or reaches a predetermined value the shaking time has come. Therefore, I set a timer 83′ which controls valve 49 to suit the interval between shakings. When set, the plug of valve 49 will be turned 90 degrees at predetermined intervals whereby pressure is exhausted from one end of cylinder 48 while it is admitted at the other. By properly arranging the ports in valve 49, enough air can be trapped on exhaust to cushion the piston at each end of its stroke in the cylinder.

The apparatus above described having to do with burning the phosphorus to gaseous phosphorus pentoxide, the supplying of cooled air to duct 14, ammonia to the reactor, and operation and shaking of the filter bags in units 15 and 15a, can all be accomplished automatically as illustrated in Figs. 2a and 7. By this arrangement, the primary air is regulated in accordance with the rate of feed of phosphorus to the burner 12, the rate of feed of ammonia to the reactor being regulated in accordance with the rate of feed of phosphorus, and the cooling air admitted to duct 14 being regulated automatically from the temperature of the mixture discharged from the reactor.

As shown in Fig. 7, a diagram operated valve 86 is provided in the phosphorus feed line 16 which is operable from a manually controlled sending relay 87. The relay 87 may be adjusted to deliver a loading pressure to the diaphragm 88, whereby the phosphorus feed valve is opened to establish a desired rate of feed of phosphorus, it being assumed that the pressure head in the phosphorus feed tank has been adjusted to a value that will produce the rate of flow of phosphorus required. The phosphorus flows through a meter 88M having associated therewith a valve 89 which develops a pneumatic pressure in a line 90 that varies by and in accordance with the pressure drop developed across orifice 91 and acting on a bellows 91a in the meter. The pressure developed by valve 89 loads a diaphragm 89a disposed to act on a beam 89b to which bellows 91a is connected and balance the moment of the bellows on the beam. Thus for every pressure drop across orifice 91 a definite balancing pressure will be established by valve 89. This pressure drop is therefore a function of the flow of phosphorus through the feed line. The pressure developed in line 90 is utilized to load pneumatic loaders 92a and 93a of regulators 92 and 93 which control, respectively, the rate of feed of ammonia in the ammonia feed line 42 and the rate of flow of primary air through duct 17 to the burner 12. Regulators 92 and 93 cause the rates of flow of ammonia and primary air to correspond with the rate of flow of phosphorus to burner 12, thereby insuring that these reactants will be in the proper proportions to result in the formation of ammonium metaphosphate, $NH_4PO_3$, in the reactor.

In the sending line 90 leading to regulator 92 I may provide a ratio relay 95 whereby I may adjust at will the ratio between the rates of feed of phosphorus and ammonia. This relay receives the pressure from line 90 and sends out a different pressure to regulator 92 that bears a definite ratio to the pressure in line 90 depending on the position of fulcrum 95a. In this manner I may automatically regulate the rate of feed of ammonia to any desired predetermined excess above the stoichiometric requirements for $NH_4PO_3$.

Regulator 92 responds to the pressure drop across an orifice 97 in the ammonia feed line 42 and actuates an escapement valve 100a whereby a pressure is established in line 98 leading to the diaphragm chamber 99 of an operator for a valve 100 which controls the flow of ammonia. Regulator 92 sends out pressure to the diaphragm chamber 99 that will cause the valve 100 to be so positioned as to maintain the pressure drop across the orifice 97 substantially constant. By modifying the loading pressure on regulator 92 received from the ratio regulator 95, the control point of regulator 92 may be changed so that it will operate valve 100 to hold the particular pressure drop across orifice 97 called for by the loading pressure sent out by ratio regulator 95.

Regulator 93 is similar in construction to regulator 92. It has a diaphragm 100b that responds to the pressure drop across an orifice 101 in the air supply pipe 17 and actuates a valve 100a, whereby a control pressure is developed and sent to a line 102 which is utilized to control the operation of a power cylinder 103 that actuates a damper 104 in the air supply duct 17. For every value of pressure developed in line 102 by regulator 93, power cylinder 103 will come to a definite position and therefore adjust the damper 104 to a corresponding position. For a given loading which regulator 93 has received from loading line 90, regulator 93 will cause cylinder 103 to so position damper 104 that the pressure drop across orifice 101 will be held constant at a particular value. This pressure drop will change with the loading pressure in line 89.

The pneumatic loaders 92a and 93a act on diaphragms 100b of regulators 92 and 93 and offer greater or lesser bias to the diaphragms through spring 92s that act on beams connecting the diaphragms and valves 100a. The operation of regulators 92 and 93 is stabilized by dash-pots D. P.

Damper 43, as stated previously, is controlled by power cylinder 44 and the power cylinder 44 is subject to the control of thermostat 45. Thermostat 45 is of the differential expansion type having its differential element 105 extending into the reactor at a point near its outlet or at the end of the zone in which the reaction between gaseous phosphorus pentoxide, water and ammonia has taken place. The differential expansion element 105 actuates a valve 106 and this valve transmits a control pressure to a line 107 connected to the diaphragm operated pilot valve 108 on the power cylinder. For every value of pressure delivered by the thermostat to line 107, power cylinder 44 will actuate damper 43 to a definite position. Thus, as the temperature of the products discharging from the reactor increase above a desired control point or value, damper 43 will open wider and wider to hold the temperature down to the value desired; conversely, if the temperature falls below this value, the amount of cooling air will be decreased.

The phosphorus burner 12 is illustrated in detail in Figs. 3 and 4, and comprises a body 110 whose open inner end houses and shrouds the burner tip assembly 111. The housing is provided with a side opening 112 to which the primary air supply duct 17 is connected. Elemental phosphorus is delivered to the tip assembly 111 by a pipe 113 that enters through a bushing 114 to which it is secured, in the outer end of the housing. Bushing 114 is rotatable and movable towards or from the burner tip in order that the burner tip assembly may be adjusted towards or from the tip end of the housing. Longitudinal movement of bushing 114 is accomplished by means of a spiral groove 114a into which a pin 115 projects, and a handle 116 for turning the bushing. The pipe 113 and the tip assembly 111 are therefore adjustable lengthwise of the housing towards or from the open end of the housing.

The tip end of the housing is provided with a plurality of spaced vanes 117 extending lengthwise of the tip assembly 111, and an annular baffle 118 is disposed over the burner tip and within the vanes. The vanes and baffle thus provide a plurality of passageways through which the rate of flow of air through the burner may be adjusted and act as an adjustable orifice. The approximate air flow rate through the burner is set by adjusting the bushing 114, while the finer regulation is achieved by the damper regulator 93.

The tip assembly includes a burner head 119 disposed within baffle 118 and into which the tip end of feed pipe 113 is threaded, and a burner tip or nipple 120 of smaller diameter than pipe 113, threaded into the forward end of the burner head 119. The forward end of nipple 120 is closed, but adjacent the closed end the nipple is provided with a plurality of lateral discharge openings 121 of about $\frac{3}{32}''$ in diameter, uniformly spaced around the tip. The nipple 120 is enclosed or housed over a substantial portion of its length by a sleeve 122 threaded at one end into the burner head 119. This sleeve is of larger diameter than nipple 120 and provides a space 123 therebetween through which compressed air supplied from a pipe 124 may be discharged to atomize the elemental phosphorus issuing from lateral openings 121. Compressed air pipe 124 enters through a wall of housing or body 110, has a coil or loop 125 therein to permit movement of the burner tip and feed pipe 113 longitudinally of the housing, and is threaded into the burner head in communication with a passageway 126 leading to the space 123. In practice, compressed air at a pressure of about forty pounds per sq. in. may be supplied by pipe 124 for atomizing purposes.

A burner such as shown and described above, is efficient in operation and capable of burning phosphorus much the same as oil and liquid fuels are burned. The compressed air supplied to the burner tip at a pressure of about 40 lbs./in.$^2$ atomizes the phosphorus and the primary air is thoroughly mixed with the phosphorus particles. When the primary air is preheated, burning of the phosphorus is greatly facilitated and I may use as little as 20% excess air, and effect complete burning of the phosphorus.

Higher values of excess primary air may be employed and may reach values of the order of several hundred percent. These high values of excess air lower the temperature of the products of combustion in the fire box and therefore reduce the amount of heat transferred to the cooling fluid in the walls of the fire box and require correspondingly larger volumes of cooling air ahead of the reactor and in the collectors. I therefore prefer to operate at values below 100% for excess primary air.

As indicated in the drawings, the burner shown in Figs. 3 and 4 is mounted in a sleeve 127 in the front end of the fire box. This sleeve may be refractory lined and long enough to provide adjustment of the burner in it to confine more or less the phosphorus flame to a limited extent to facilitate rapid and thorough combustion.

Having thus described the invention, it will be apparent to those skilled in this art that various modifications and changes may be made therein without departing either from the spirit or the scope of the invention.

What I claim as new and desire to secure by Letters Patent, is:

1. A method of producing crystalline ammonium metaphosphate as a dry free-flowing powder that consists in supplying elemental phosphorus to a combustion chamber and supplying air to the phosphorus at its point of delivery to the combustion chamber, the ratio of air supply rate to the rate of supply of phosphorus being such that the phosphorus is burned to phosphorus pentoxide, feeding the phosphorus and combustion air to the combustion chamber at such rates that the temperature resulting from the reaction of air and phosphorus maintains the reaction product phosphorus pentoxide in a gaseous state discharging the phosphorus pentoxide from the combustion chamber into a reaction chamber, introducing atmospheric cooling air and ammonia into said reaction chamber, the ammonia being supplied at a rate sufficient to react with the phosphorus pentoxide and the water supplied thereto by said cooling air and the water in said combustion air to form ammonium metaphosphate, discharging the ammonium metaphosphate into a collecting chamber, supplying cooling air into the collecting chamber adjacent the point of entry thereinto of the ammonium metaphosphate and so regulating the amounts of cooling air supplied to said reaction chamber and to said collecting chamber that the temperature of the ammonium phosphate in the collection chamber is not more than about 450° F.

2. A method according to claim 1 characterized by the fact that the temperature of the walls of the combustion chamber is maintained at a value above the condensation temperature of phosphorus pentoxide and water vapor and that the combustion air is atmospheric air containing moisture.

3. A method according to claim 1 characterized by the fact that the air for combustion of the phosphorus is preheated to temperatures ranging from ambient to about 2000 degrees F.

4. A method according to claim 1 characterized by the fact that the phosphorus and air are supplied to the combustion chamber at such a rate as to establish a temperature therein in excess of 900 degrees F.

5. A method according to claim 1, characterized by the fact that the air supplied to burn the phosphorus is dried to remove atmospheric moisture therefrom, that the air supplied to the inlet to the reaction chamber and to the collecting chamber at the point where the ammonium metaphosphate discharges thereinto, is atmospheric air, and that water is introduced into the reaction chamber in amount sufficient to cause all of the phosphorus pentoxide to react with the ammonia to form crystalline ammonium metaphosphate in said reaction chamber.

6. A method according to claim 1 characterized by the fact that the combustion air is dried to remove atmospheric moisture therefrom, and preheated to a temperature between ambient and 2000 degrees F., and then reacted with the phosphorus at the point of delivery to the combustion chamber while at such temperature.

7. A method according to claim 1 characterized by the fact that the cooling air introduced into the phosphorus pentoxide discharging from the combustion chamber is delivered into the phosphorus pentoxide stream counter-flow to the flow of said pentoxide.

8. A method according to claim 1 characterized by the fact that the combustion air and phosphorus are reacted in the combustion chamber at such a rate as to generate temperatures therein above 900 degrees F. but below about 3000 degrees F., and that the atmospheric air delivered to the phosphorus pentoxide discharging from said chamber is supplied at a rate sufficient to cool the reaction product in the reaction chamber to a temperature within a range of between 1400 degrees F. and 600 degrees F., and that the cooling air supplied to the collecting chamber at the point where the ammonium metaphosphate enters the same is in amount sufficient to reduce the temperature of said ammonium metaphosphate to a value below about 450 degrees F.

9. Apparatus for producing crystalline ammonium metaphosphate as a dry free-flowing powder comprising a fluid-cooled hollow walled steel housing shaped to provide an enclosed combustion chamber, said housing having a port in a wall at one end of said chamber, a burner in said port provided with an inlet for elemental phosphorus and forced draft air, said enclosed chamber having an outlet, a closed reactor comprising a hollow member having an inlet at one end and an outlet at the opposite end, said reactor inlet being connected to the outlet of said combustion chamber to receive the phosphorus pentoxide discharging from said combustion chamber, a cooling air supply pipe connected to the inlet of said reactor for discharging air into said phosphorus pentoxide as it discharges from said combustion chamber, means for introducing ammonia into the inlet to said reactor to react with said phosphorus pentoxide and the water vapor contained in said cooling air and the combustion air, a collector comprising a hollow closed housing provided with discharge openings and filter means connected to said openings, said housing being connected to the outlet of said reactor for collecting the ammonium metaphosphate discharging from said reactor, means for regulating to a substantially constant value the rate of supply of ammonia to the reactor, means for regulating to a substantially constant value the rate of supply of forced draft air to said burner, and means responsive to the rate of flow of phosphorus to the burner adatped to control the regulators for air flow and ammonia flow so that the air and ammonia flow rates are adjusted in accordance wtih the departure of the phosphorus flow rate from a predetermined value.

10. Apparatus according to claim 9 characterized by the fact that means are provided for drying the combustion air supplied to said burner, and that means are provided for introducing water into the inlet of said reactor in amount sufficient to cause all of the phosphorus pentoxide to react with the ammonia and water while in said reactor to form ammonium metaphosphate.

11. Apparatus according to claim 9, characterized by the fact that the hollow steel housing is provided with a refractory liner to retard heat flow from the combustion chamber into the cooling fluid in the hollow walls of said housing.

12. Apparatus according to claim 9, characterized by the fact that the burner is provided with a nozzle through which compressed air may be discharged to effect atomization of the phosphorus, and that means are provided for heating the combustion air delivered to said nozzle to a temperature in the range of from above ambient to about 2000 degrees F.

13. Apparatus in accordance with claim 9 characterized by the fact that a jacket surrounds the reactor and that means are provided for passing the forced draft air through the jacket of the reactor to heat the forced draft air to a temperature in the range of from about 200 degrees F. to a temperature below the temperature existing in the reactor, before the forced draft air is introduced into the enclosed combustion chamber.

14. Apparatus in accordance with claim 9 characterized by the fact that means are provided for supplying additional cooling air into the collector housing at a location adjacent the point of entry thereinto of the ammonium metaphosphate.

15. A method of producing crystalline ammonium metaphosphate as a dry free-flowing powder that consists in supplying elemental phosphorus to a refractory lined combustion chamber, cooling the exterior surface of said combustion chamber, supplying atmospheric air preheated to a temperature of between ambient and about 2000 degrees F. to the phosphorus at its point of delivery to the combustion chamber at a rate in excess of the amount theoretically required to burn the phosphorus to phosphorus pentoxide, the phosphorus and air being supplied to the combustion chamber at such a rate as to establish a temperature therein of the order of 900 degrees F. to 1700 degrees F., discharging the phosphorus pentoxide from the combustion chamber into a reaction chamber, introducing cooling atmospheric air and ammonia into said reaction chamber, the ammonia being supplied at a rate sufficient to react with the phosphorus pentoxide and water supplied thereto by said combustion air and said cooling air to form ammonium metaphosphate, the cooling air being supplied at a rate sufficient to cool the reaction product in said reaction chamber to a temperature within the range of between 1400 degrees F. and 600 degrees F., discharging the excess air and ammonia and water vapor and the ammonium metaphosphate suspended therein into a filter chamber, and supplying supplementary cooling air into the filter chamber adjacent the point of entry thereinto of the ammonium metaphosphate, the supplementary cooling air being supplied to the filter chamber in an amount sufficient to reduce the temperature of the ammonium metaphosphate to below 450 degrees F.

16. A method according to claim 15 characterized by the fact that the phosphorus is supplied to the combustion chamber at a rate of substantially one pound per hour per cubic foot of interior volume in the combustion chamber.

17. A method in accordance with claim 15 characterized by the fact that the combustion air is directed in indirect heat transfer relationship about the reaction chamber before being introduced into the combustion chamber, whereby the combustion air is preheated.

18. A method in accordance with claim 15 characterized by the fact that water is introduced into the reaction chamber in an amount sufficient to cause all of the phosphorus pentoxide to react with the ammonia to form crystalline ammonium metaphosphate.

19. A method according to claim 15 characterized by the fact that the atmospheric air is dried prior to preheating and delivery to the combustion chamber.

20. Apparatus for producing crystalline ammonium metaphosphate as a dry free-flowing powder comprising a fluid-cooled hollow walled steel housing shaped to provide an enclosed combustion chamber, a wall of said housing at one end of said chamber being provided with a port, a burner in said port provided with inlets for elemental phosphorus and forced draft air, respectively, said burner having a nozzle through which compressed air may be discharged into said phosphorus to effect atomization thereof, a refractory liner in the hollow steel housing for retarding heat flow from the combustion chamber into the cooling fluid in the hollow walls of said housing, said combustion chamber having an outlet, a closed reactor comprising a hollow member having an inlet connected to said combustion chamber outlet to receive the phosphorus pentoxide discharging from said combustion chamber, a cooling air supply pipe connected to the inlet of said reactor for discharging air into said phosphorus pentoxide as it discharges from said combustion chamber, means for introducing ammonia into the inlet of said reactor to react with said phosphorus pentoxide and the water vapor contained in the cooling air and the combustion air, bag filter means connected to the outlet of said reactor for collecting the ammonium metaphosphate delivered thereto, means for supplying additional cooling air into the filter adjacent the point of entry thereinto of the ammonium metaphosphate, means for regulating to a substantially constant value the rate of supply of ammonia to said reactor, means for regulating to a substantially constant value the rate of supply of forced draft air to the burner, and means responsive to the rate of flow of phosphorus to the burner adapted to control the regulators for air flow and ammonia flow so that the air and ammonia flow rates are adjusted in accordance with the departure of the phosphorus flow rate from a predetermined value.

21. Apparatus in accordance with claim 20 characterized by the fact that means are provided for introducing water into the inlet to said reactor in at least an amount sufficient to cause all of the phosphorus pentoxide to react with the ammonia to form crystalline ammonium metaphosphate.

22. Apparatus in accordance with claim 20 characterized by the fact that a jacket surrounds the hollow member of said reactor and that means are provided for passing the forced draft air through the jacket of the reactor to heat the forced draft air to a temperature in the range of from about 200 degrees F. to a temperature under that existing in the hollow member of the reactor before the forced draft air is introduced into the combustion chamber.

23. A method of producing crystalline ammonium metaphosphate as a dry free-flowing powder that consists in supplying elemental phosphorus to a fluid-cooled jacketed combustion chamber, supplying air pre-heated to a temperature of between 200 degrees F. and about 1500 degrees F. to the phosphorus at its point of delivery to the combustion chamber at a rate in excess of the amount theoretically required to burn the phosphorus to phosphorus pentoxide, the phosphorus and air being supplied to the combustion chamber at such a rate as to establish a temperature therein of the order of 1400 degrees F. to 1700 degrees F., discharging the phosphorus pentoxide from the combustion chamber into a reaction chamber, introducing cooling atmospheric air and ammonia into said reaction chamber, the ammonia being supplied at a rate sufficient to react with all the phosphorus pentoxide and water supplied thereto by said cooling air to form ammonium metaphosphate, the cooling air being supplied at a rate sufficient to cool the reaction product in said reaction chamber to a temperature within the range of between 1200 degrees F. and 600 degrees F., discharging the mixture of excess air, ammonia and water vapor and ammonium metaphosphate suspended therein into a filter chamber having an air-pervious wall, and supplying supplementary cooling air into the filter chamber adjacent the point of entry thereinto of the mixture containing the ammonium metaphosphate, the supplementary cooling air being supplied to the filter chamber in amount sufficient to reduce the temperature of the ammonium metaphosphate to below 450 degrees F.

24. A method according to claim 23, characterized by the fact that the phosphorus is supplied to the combustion chamber at a rate of substantially one pound per hour per cubic foot of interior volume of the combustion chamber.

25. A method in accordance with claim 23, characterized by the fact that the combustion air is directed in indirect heat transfer relationship about the reaction chamber before being introduced into the combustion chamber, whereby the combustion air is preheated.

26. A method in accordance with claim 23, characterized by the fact that water is introduced into the reaction chamber in at least an amount sufficient to cause all of the phosphorous pentoxide to react with the ammonia to form crystalline ammonium metaphosphate.

27. A method according to claim 23 in which the preheated air delivered to the combustion chamber is dried air.

28. A method of producing ammonium metaphosphate in the form of a substantially dry free flowing powder, which comprises supplying elemental phosphorus, air, and water to a combustion zone maintained at a temperature of about 932° F. to about 1652° F. where the phosphorus is burned to phosphorus pentoxide vapor, introducing ammonia at a point located outside of said combustion zone into said phosphorus pentoxide vapor and the water vapor mixed therewith in such proportions that the ammonia and water vapor react with substantially all of said phosphorus pentoxide to produce ammonium metaphosphate while the reactants are substantially completely in the vapor state, immediately cooling the resulting reaction product to a temperature below 572° F. in the period of a few seconds and then recovering the ammonium metaphosphate content of said product, said ammonium phosphate reaction being carried out within the temperature range of about 572° F. to about 932° F. and said water being employed in an amount at least corresponding to approximately 100% of that theoretically required to form ammonium metaphosphate.

References Cited in the file of this patent

UNITED STATES PATENTS

| Number | Name | Date |
| --- | --- | --- |
| 1,194,077 | Ross et al. | Aug. 8, 1916 |
| 1,514,912 | Klugh | Nov. 11, 1924 |
| 2,003,725 | Skinner | June 4, 1935 |
| 2,026,519 | Curtis | Jan. 7, 1936 |
| 2,039,981 | Rembert | May 5, 1936 |
| 2,142,943 | Kerschbaum | Jan. 3, 1939 |
| 2,144,971 | Heller et al. | Jan. 24, 1939 |
| 2,280,848 | Pole | Apr. 28, 1942 |
| 2,420,999 | Ayers | May 27, 1947 |